(12) United States Patent
Briancon et al.

(10) Patent No.: US 11,190,913 B2
(45) Date of Patent: *Nov. 30, 2021

(54) METHOD AND SYSTEM FOR NETWORK DISCOVERY AND MANAGEMENT AND ASSOCIATED E-COMMERCE

(71) Applicant: Charter Communications Operating, LLC, St. Louis, MO (US)

(72) Inventors: Alain C. Briancon, Poolesville, MD (US); Edward R. Thomas, London (GB); David P. Thompson, Carshalton (GB)

(73) Assignee: Charter Communications Operating, LLC, St Louis, MO (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/410,396

(22) Filed: May 13, 2019

(65) Prior Publication Data

US 2019/0268735 A1     Aug. 29, 2019

Related U.S. Application Data

(63) Continuation of application No. 15/339,435, filed on Oct. 31, 2016, now Pat. No. 10,327,118, which is a continuation of application No. 14/092,685, filed on Nov. 27, 2013, now abandoned.

(60) Provisional application No. 61/731,948, filed on Nov. 30, 2012.

(51) Int. Cl.
| | |
|---|---|
| *H04W 4/21* | (2018.01) |
| *H04W 84/12* | (2009.01) |
| *H04W 88/02* | (2009.01) |

(52) U.S. Cl.
CPC ............ *H04W 4/21* (2018.02); *H04W 84/12* (2013.01); *H04W 88/02* (2013.01)

(58) Field of Classification Search
CPC ........ H04W 4/21; H04W 84/12; H04W 88/02
See application file for complete search history.

(56) References Cited

U.S. PATENT DOCUMENTS

| | | | |
|---|---|---|---|
| 6,985,922 B1 | 1/2006 | Bashen et al. | |
| 7,263,076 B1 | 8/2007 | Leibovitz et al. | |
| 7,275,260 B2 | 9/2007 | de Jong et al. | |
| 7,593,942 B2 | 9/2009 | Sack et al. | |
| 7,831,570 B2 | 11/2010 | Sack et al. | |
| 8,009,694 B2 | 8/2011 | Thompson et al. | |
| 8,194,589 B2 | 6/2012 | Wynn et al. | |
| 8,683,103 B2 | 3/2014 | Ripberger | |
| 9,094,391 B2* | 7/2015 | Barbir | H04L 63/08 |

(Continued)

*Primary Examiner* — Alpus Hsu
(74) *Attorney, Agent, or Firm* — Straub & Straub; Stephen T. Straub; Michael P. Straub

(57) ABSTRACT

The subject matter described herein relates to wireless network discovery, management, the enabling of services, and economic exchanges in a cooperative manner by one or more federated sets of consumers, one or more access point providers, and one or more wireless service providers. Described herein are methods and apparatus for the discovery, classification, and management of wireless networks. The methods and apparatuses described herein may leverage two complementary elements impacting the performance of wireless LANs: (1) organization and management of the wireless access points (hot spots) from an ontology perspective, and (2) organization of mobile devices as a federation.

20 Claims, 3 Drawing Sheets

(56) References Cited

U.S. PATENT DOCUMENTS

| | | | |
|---|---|---|---|
| 9,176,902 B1 | 11/2015 | Long et al. | |
| 9,247,489 B2 | 1/2016 | Xiang et al. | |
| 9,411,819 B1 * | 8/2016 | Long | H04L 41/082 |
| 9,531,835 B2 | 12/2016 | Wynn et al. | |
| 9,801,095 B2 | 10/2017 | Henderson et al. | |
| 10,327,118 B2 | 6/2019 | Briancon et al. | |
| 2006/0184997 A1 | 8/2006 | La Rotonda et al. | |
| 2010/0008259 A1 | 1/2010 | Yoon et al. | |
| 2010/0220687 A1 | 9/2010 | Reznik et al. | |
| 2014/0153486 A1 | 6/2014 | Briancon et al. | |
| 2015/0142986 A1 | 5/2015 | Reznik et al. | |

\* cited by examiner

METHOD AND SYSTEM FOR NETWORK DISCOVERY AND MANAGEMENT AND ASSOCIATED E-COMMERCE

CROSS REFERENCE TO RELATED APPLICATIONS

This application is a continuation of U.S. patent application Ser. No. 15/339,435 filed on Oct. 31, 2016 which published as U.S. patent application publication No. US 2017-0272924 A1 on Sep. 21, 2017 which is a continuation of U.S. patent application Ser. No. 14/092,685 filed on Nov. 27, 2013 which claims the benefit of U.S. Provisional Application Ser. No. 61/731,948 filed Nov. 30, 2012, the contents of each of the aforementioned applications are hereby incorporated by reference herein in their entirety.

BACKGROUND

Wireless receive/transmit units (WRTUs) such as cellular phones have been used primarily to receive voice calls and carry voice traffic and text (SMS) messages. Today, however, users use WRTUs to access information while on the go from a variety of different sources, such as the World Wide Web, application stores, and corporate resources. Advanced WRTUs (which use operating systems such as Apple's iOS, Android, and other advanced operating systems) require significant wireless network resources because of the large data traffic they generate. Some of the data-intensive tasks that may be performed on advanced WRTUs include web surfing, receiving and displaying web pages written in HTML5, downloading applications, downloading mapping elements and other geographic data, streaming of audio and video content, and video conferencing. Additionally, corporate users seek to have secure communication to their corporate networks.

Many WRTUs have the capability to support multiple air interfaces. For example, some WRTUs implement one or more "cellular" mobile technologies such as, but not limited to, UTMS, GSM, Edge, IS-95, super-WiFi, WCDMA, TD-SCDMA, HSPDA, HSUDA, HSPA+, CDMA2000, IEEE 802.16 (Wimax), LTE, 3G, 4G, TD-LTE, and also implement "local" wireless technology such as Bluetooth, and Wireless Local Area Network (WLAN) technologies (such as those in the IEEE 802.11x family protocols, including 802.11a/b/g/n/af/ac).

Wireless access points (also referred to as "hot spots," "WiFi hot spots", APs, or WAPs) that are based on technologies in the IEEE 802.11 family have become more and more prevalent in businesses and homes. Operators and consumers alike seek to leverage these wireless access points to manage their traffic and provide communication services with adequate and predictable quality of service (QOS). Operators are actively looking at using those wireless systems to offload traffic. This is often done along with the deployment of traditional wireless standards femto-cells.

The re-farming of analog TV bands in the 700 MHz band has created new opportunities for wireless technology dubbed as "White Space". WRTUs may use this spectrum provided they do not interfere with other devices using the same spectrum. Unlike Wireless LANs, checking on the availability of the spectrum is required on a regular basis. This may be done, among others, by mapping the location of a WRTU against a geo-location database or by using a WRTU-born sensor to detect the presence of transmitters (such as by but not limited to microphones). Sensor-based management solutions impact WRTU battery life, as they must constantly verify a status of the spectrum.

Wynn and Fraser teach in U.S. patent application Ser. No. 12/240,969 about creating network profiles (basically characteristics) for discovered wireless networks and the management of the attributes of these profiles over time, allowing the management of attributes. It is limited to being predicated solely on the network profile and does not take in account the functional and economic nature of the wireless network being considered. This "one size fits all" method suffers from supporting business models and operations of networks that are differentiated by ancillary economic or social components.

Wynn and Fraser further teach in U.S. patent application Ser. No. 11/823,698 about sharing information about network profiles between users. It allows, under user control, the sharing of the network profile to one or more other users. While this facilitates the discovery of the network, it does not allow for collaborations between users.

Wireless networks in the past have been perceived from the narrow perspective of network operators where matters such as delay, throughput, and coverage are the attributes that matter regardless of the nature of the network underlying the deployment not as a semantically set commerce transaction enabler or marketplace.

While considering models used in e-commerce and social networking, one must, however, be mindful that models that apply to one type of activity (such as purchases) do not apply to other domains (such as networking). Group incentives for commerce such as sites like Groupon or Living Social rely on having a minimum number of consumers interested in a specific offer before making it effective. Some social purchasing sites create an incentive for sharing more information about offers by offering a pyramid like incentive (get three friends to sign on and get an offer for free or reduced price). This type of offer management is appropriate when considering commercial activities. It is however not conducive to network management activities.

Business applications such as electronic commerce ("e-commerce") applications, Customer Relationship Management ("CRM") applications, Human Resource Management (HRM) applications, bidding and auction sites, and electronic catalogs are pervasive. A single merchant, business, or seller may operate such business applications. They may be accessed through broadband wired and wireless means, using among others smartphones, tablets, and personal computers. Such business applications may also be, as an example, centrally controlled or hosted to create an online marketplace. This marketplace can include numerous merchants, businesses, or sellers. They may not been integrated or coupled with the nature of the network they are being accessed with.

SUMMARY

The subject matter described herein relates to wireless network discovery, management, the enabling of services, and economic exchanges in a cooperative manner by one or more federated sets of consumers, one or more access point providers, and one or more wireless service providers. Described herein are methods and apparatus for the discovery, classification, and management of wireless networks. The methods and apparatuses described herein may leverage two complementary elements impacting the performance of wireless LANs: (1) organization and management of the wireless access points (hot spots) from an ontology perspective, and (2) organization of mobile devices as a federation.

BRIEF DESCRIPTION OF THE DRAWINGS

A more detailed understanding may be had from the following description, given by way of example in conjunction with the accompanying drawings wherein.

DETAILED DESCRIPTION

Figure 1:
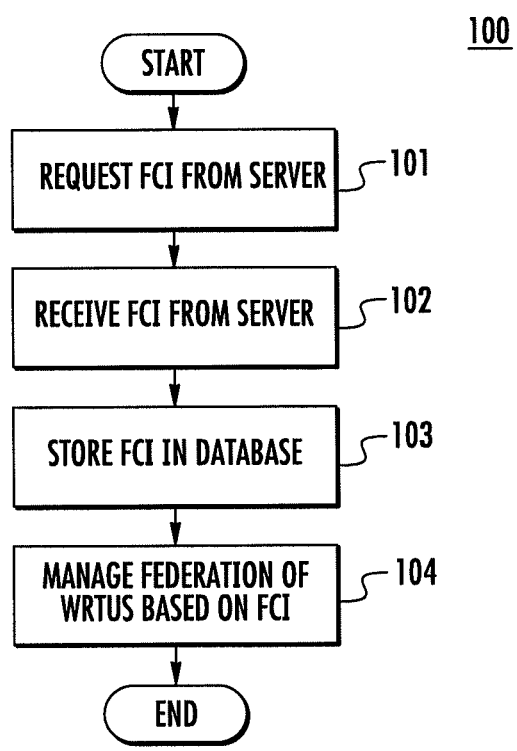
FIG. 1 shows a flow chart of an example process for creating and managing a federation of WRTUs.

As used herein, wireless receive/transmit unit (WRTU) includes but is not limited to a wireless phone, a smartphone, a tablet, a personal computer, a Universal Serial Bus (USB) modem, a PCMCIA modem, a telemetry modem, a test modem, a user equipment (UE), a station (STA), a mobile station (MS), a subscriber terminal, a mobile terminal, and/or any other type of device capable of communicating in a wireless environment.

As used herein, wireless access point (WAP) includes but is not limited to an access point (AP), a hot spot, or a WiFi hot spot.

As used herein, the term "connected" means that elements within the system are connected physically or functionally (via, for example, a remote connection). A connection may be temporary or permanent. As a non-limiting example, a remote connection may be through a localized Radio Frequency (RF) link. Alternatively or additionally, a connection may be a wired connection through a dedicated network and/or via the Internet.

The words "a" and "one," as used herein, are defined as including one or more of the referenced items unless specifically stated otherwise. The phrase "at least one" followed by a list of two or more items, such as "A, B, or C," means any individual one of A, B or C as well as any combination thereof. Further, as used herein, the singular forms "a," "an," and "the" include plural referents unless expressly and unequivocally limited to one referent. For example, while examples are provided above wherein a single instance of a credit/credential management system (CCMS) is referred to, it may be understood that the features described herein in a single CCMS may be implemented across multiple CCMS.

Value as used herein means a good, a service, or a pecuniary interest including cash, check, credit, and conditional credit.

Transaction as used herein means an exchange involving at least two parties. A purchase is a transaction. A subscription is a specific purchase and is thus a transaction. The exchange of information about a wireless network is a transaction. Receipt of an incentive offer (such as the act of downloading an incentive offer, banking a social network "like" or the act of rendering an offer on a terminal or cellphone), presentment of incentive offer at a retailer or online, redemption of an incentive offer, rating of one more or component and participation in a consumer survey are transactions.

Purchase as used herein means a transaction in which cash, check, charge, or credit is exchanged for one or more goods and services.

Transaction incentive as used herein means an offer for a certain value in exchange for entering into a specified transaction.

Purchase incentive as used herein means an incentive wherein the specified transaction for which the incentive is offered is a purchase.

Incentive as used herein means the certain value associated with entering into a transaction specified in a transaction incentive.

Incentive terms and transaction incentive terms as used herein each mean the specifications of the transaction into which someone must enter to be entitled to the incentive associated with the transaction incentive.

Purchase incentive terms as used herein mean the specifications of the purchase into which someone must enter to be entitled to the incentive associated with the purchase incentive.

Coupons as used herein are certificates with one or more purchase incentive terms consumers present at the time of purchase.

Queries from database to database system as used herein may be done directly (through say XML or JSON queries). They may also be done using proxy servers and/or caching/fetching systems. It is understood that architectures with these types of intermediate systems are covered by the example embodiments described herein.

Classification and managements of wireless access points using taxonomies and ontologies are both described herein.

Described herein are methods and apparatus for the management of Wireless LANs, which build on two key elements: 1) the classification of wireless networks using a commercial-social centric ontology and 2) the organization of WRTUs into WRTU federations.

Ontology may be defined as the exact description of things and their relationships. Ontologies have become important elements of the web standards, especially in terms of the semantic web. OWL (Web Ontology Language released in 2004 by W3C) is the primary Web Ontology Language. It is used extensively in science classifications and market-specific e-commerce applications.

The ontology of wireless networks as used in the methods and apparatuses described herein goes beyond the physical (for instance, located at XX and YY), logical (for instance IP address 192.156.184.5), and functional (for instance, 802.11ac WiFi capable of supporting video streaming) description of wireless networks. The ontology of the methods and apparatuses described herein allows the introduction of relations between classes of wireless networks (e.g. disjoint vs. continuous coverage), cardinality (e.g. "exactly one"), equality (e.g. it may allow WiFi-camera), and characteristics of properties (e.g. hot spot moves on the schedule of the German Train System). This goes beyond taxonomies that are solely hierarchical categorizations or classifications of entities within a domain.

Ontology may also be defined as the set of all possible characteristics of the entities in a domain, and taxonomy may simply be a grouping of subsets of the domain based on common characteristics that have been chosen for the particular taxonomy.

A WRTU federation may be defined as a loosely coupled affiliation of WRTUs whose users adhere to certain standards of social behavior and/or standards of commerce. The WRTU federation may provide a mechanism for trust among those users with respect to certain operations for the users within the federation. For example, a federation partner may act as a proxy for another partner. Other partners within the same federation may rely on the user's identity provider for primary management of the user's authentication credentials or virtual private network parameters. It may further be envisioned that participants in the federation may continue to independently manage and operate their WRTUs with minimal change required to participate in the federation. A WRTU may belong to one of more federations. WRTU federations may be organized around locations (or sets of locations, such as the wireless hot spots around Piccadilly Circus), activities (travelling on the same airlines or the same train line), or commerce (lovers of the same brands of coffee).

Communications between elements of the WRTU Federation may be peer to peer, one to one, or group wide (multicast).

An Ontology Library (OLB) may used to provide collective information for the access point ontology. The OLB may be implemented in a management server. A Federation Database (FDB) may be used to manage the federation of WRTUs, and may also be implemented in a management server. The two database systems may communicate through a network, such as but not limited to the Internet. This OLB may be used to create a series of profiles that are downloaded to one or more members of one or more federations as requested by the FDB. The FDB may be connected to one or more social network gateways (such as Twitter, Facebook) through an API. This allows the integration of preferences into the activities.

FIG. 1 shows a flow chart of an example method for creating and managing a federation of WRTUs 100 in accordance with a first embodiment, which may be used in combination with any of the other embodiments described herein. The process shown in FIG. 1 may be initiated, for example, when a WRTU transmits a request to create a federation that may be received by the FDB. The FDB may then begin the federation creation process by transmitting a request for a federated community identification (FCI) from the OLB management server 101. The FDB may then receive the FCI from the OLB management server 102. The FDB may then store the FCI in its database 103. The FDB may then proceed to manage the federation of WRTUs based on the FCI 104.

The FDB may also request and receive a management policy object (MPO), which may be used with the FCI to create the federation, and the FDB may then manage the federation based on the FCI and MPO. An MPO may enable one or more transactions to be performed based in part on a defined ontology. MPOs may for example be encoded in one or more digital objects (DO), which may be transmitted to one or more WRTUs within the coverage area of a WAP or within the federation. The DOs may also be transmitted to the WRTUs in the federation based on their FCI. DOs may be taken from sources including but not limited to the following a virtual private network (VPN) profile, economic incentives, and/or transaction incentives.

Figure 2:
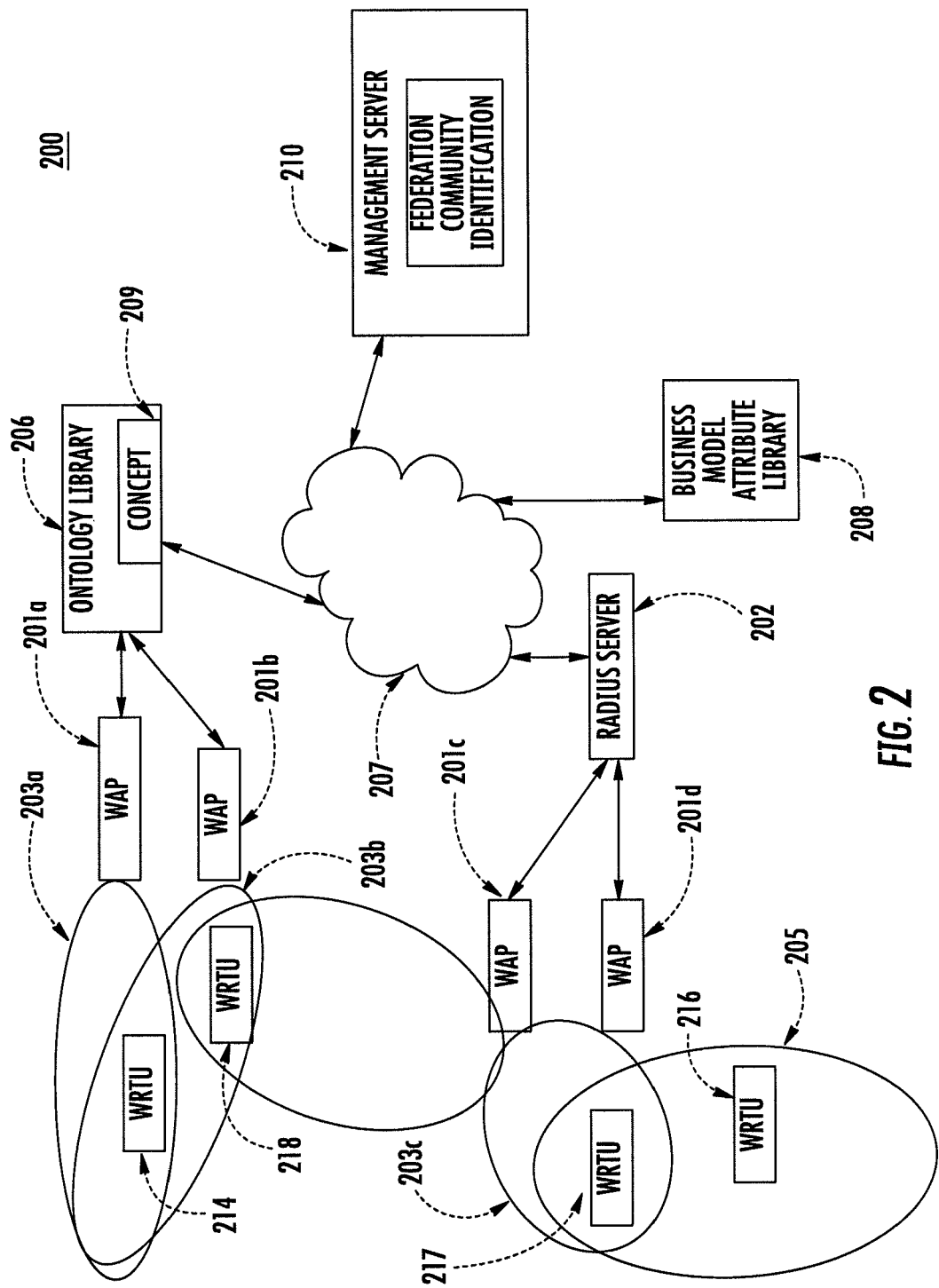
FIG. 2 shows an example of ontology managed wireless LAN hot spots system.

FIG. 2 shows an example network architecture 200 in which method of the first embodiment described herein may be implemented. The architecture of FIG. 2 includes one more Wireless Local Area Network (WLAN) access points (WAPs) 201a, 201b, 201c, and 201d, which are managed by one or more RADIUS servers 202. These WAPs may provide specific areas of coverage 203a, 203b, 203c, and 205 with various QoS and cost of use. The architecture of FIG. 2 also includes an ontology library 206 including concept 209. The management server and the business model attribute library 208 may be connected via the Internet 207. Also connected to the Internet 207 are at least one or more WRTUs 214, 216, 217, and 218. The FCI may be implemented in management server 210.

As shown in FIG. 2, some of the WRTUs such as WRTU 214 may receive coverage only via a WLAN. Some WRTUs such as WRTU 216 may have only cellular coverage. Other WRTUs such as WRTU 217 may have coverage in both cellular and WLAN networks. Other WRTUs may have coverage from two independently controlled WLANs.

Figure 3:
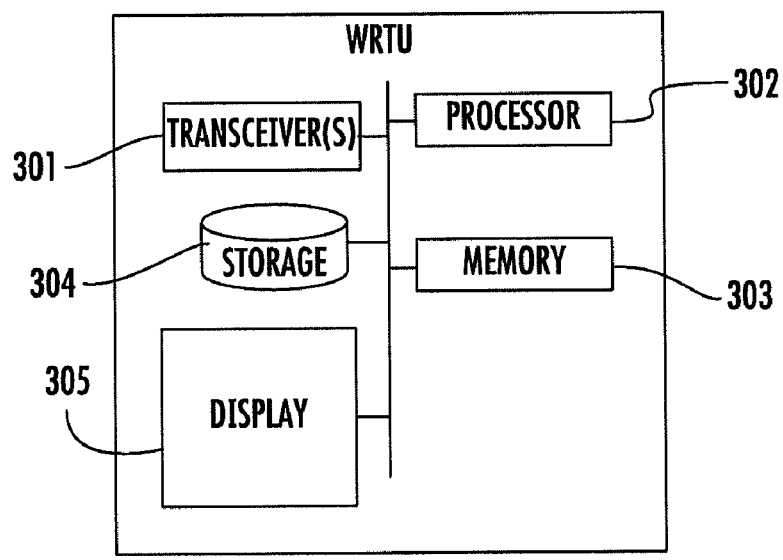
FIG. 3 is a block diagram of a WRTU that may be used to implement features described herein.

FIG. 3 is a block diagram of an example WRTU 300 that may be used to implement the features or methods described herein. The WRTU may include one or more transmitter, receivers, or transceivers 301, a processor 302, a memory device 303, a data storage device 304, and a display device 305. These components may be connected via a system bus in the WRTU, and/or via other appropriate interfaces within the WRTU.

The memory device 303 may be or include a device such as a Dynamic Random Access Memory (D-RAM), Static RAM (S-RAM), or other RAM or a flash memory. The data storage device 304 may be or include a hard disk, a solid-state disk (SSD), or any other type of device for persistent data storage.

The one or more transceivers 301 may implement various radio access technologies, including any combination of the radio access technologies mentioned herein, including but not limited to UTMS, GSM, Edge, IS-95, WCDMA, TD-SCDMA, HSPDA, HSUDA, HSPA+, CDMA2000, IEEE 802.16 (WiMAX), LTE, 3G, 4G, TD-LTE, Bluetooth, Wireless Local Area Network (WLAN) technology, and 802.11x technology (including 802.11a/b/g/n).

The display device 305 may be a Liquid Crystal Display (LCD) or Organic Light-Emitting Diode (OLED) display device, or any other appropriate type of display device. The display may be a touchscreen display, which may be based on one or more technologies such as resistive touchscreen technology, surface acoustic wave technology, surface capacitive technology, projected capacitive technology, and/or any other appropriate touchscreen technology.

The WRTU of FIG. 3 may be configured to perform any feature or features or methods described herein as performed by a WRTU. Alternatively or additionally, the memory device 303 and/or the data storage device 304 in the WRTU may store instructions which, when executed by the processor 302 in the WRTU (in conjunction with the other components in the WRTU such as the one or more transceivers 301, memory device 303, display device 305, and/or data storage device 304), may cause the WRTU to perform any feature or combination of features described herein as performed by a WRTU.

Figure 4:
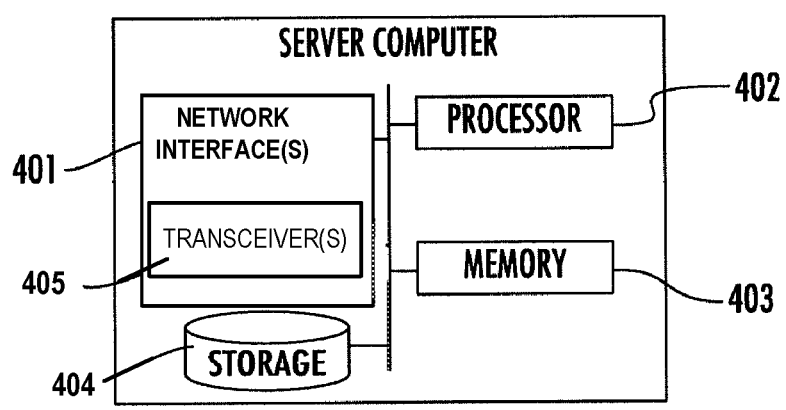
FIG. 4 is a block diagram of a server computer that may be used to implement features described herein.

FIG. 4 is a block diagram of a server computer 400 that may be used to implement any of the features or methods described herein. The server computer includes one or more network interfaces 401, a processor 402, a memory device 403, and a data storage device 404. These components may be connected via a system bus in the server computer, and/or via other appropriate interfaces within the server computer.

The memory device 403 may be or include a device such as a Dynamic Random Access Memory (D-RAM), Static RAM (S-RAM), or other RAM or a flash memory. The data storage device may be or include a hard disk, a solid-state disk (SSD), or any other type of electronic device for persistent data storage.

The one or more network interfaces 401 may be or include one or more wired and/or wireless transceivers and/or may implement various wired and/or wireless data communication technologies, including any combination of the radio access technologies mentioned herein. Network interfaces 401 in FIG. 4 are illustrated as including transceivers 405 which may be wired and/or wireless transceivers. Alternatively or additionally, the one or more network interfaces may implement technologies such as IEEE 802.3 and/or Digital Subscriber Line (DSL) technology.

The server computer of FIG. 4 may be configured to perform any feature or method or combination of features or methods described herein as performed by a server computer, and/or any feature or combination of features described herein as performed by an AAME, AS, and/or WS. Alternatively or additionally, the memory device 403 and/or the data storage device 404 in the server computer may store instructions which, when executed by the processor 402 in the server computer (in conjunction with the other components in the server computer such as the one or more network interfaces 401, memory device 403, and/or data storage device 404), may cause the server computer to perform any feature or combination of features described herein as performed by an AAME, AS, and/or WS.

In another embodiment a federation of WAPs may be managed by an FDB or OLB management server in a federation of WAPs to integrate wireless connectivity management and business applications. For example, a request to create a federation may be received from a WAP, and a record may be created for the WAP in an OLB management server. WAP descriptions may then be stored as concepts of a device ontology in the OLB management server. WAP operational parameter descriptions may be stored as concepts of a performance ontology in the OLB management server. Then the device and performance ontologies based on the descriptions may be used to identify operations supported by the WAP and to store the identified operations in the OLB management server. These descriptions may include but are not limited to being associated with device specifications and/or performance parameters. The concepts may include but are not limited to mobile, mobile affixed on train, mobile affixed on airplane, mobile affixed on public transit, mobile affixed on airplane located in specific airport, mobile in common commercial area, private, commercial, business, governmental, NGO, humanitarian, and military. The OLB management server may then be scanned for WAP entries and a federation may be created based on the concepts in the OLB management server.

Alternatively or additionally, a collection of WAPs may be managed by obtaining business model attributes (BMAs) based on the location of a WAP. Specific BMAs may be extracted from the available BMAs based on geographic location. The BMAs may then be matched with concepts in an OLB management server according to geographic location, and the WAP may then be assigned incentive or transaction terms defined in the OLB management server based on the matched BMAs. The BMAs may include but is not limited to: permanent free access, free access for loyal customers, rental access, trade access, credit for access, and relay access. The OLB management server may then be scanned for WAP entries and a federation may be created based on the concepts in the OLB.

In another embodiment, a federated WRTU may expect coverage in a specific area. If the WRTU does not get coverage, it may record that absence into memory and transmit this information at a later time (for example in a another hot spot) or by using the broad area cellular network.

In another embodiment, the OLB management server may interface with one or more external servers associated with services to which consumers whose own federated WRTUs subscribe to or use. Unlike systems that cluster WAPs based on topology or geography, this embodiment may allow rules for access to networks and services within this network to be expressed at the semantic level and thus adapt a natural language processing or domain specific from the World Wide Web. This may allow for rich service descriptions. One example may be to associate knowledge that a consumer is at a specific train station, to prompt him for a destination (or integrate with a travel site such as tripit.com), to determine the one or many destinations the user might be going to, and to download the appropriate configuration information into the WRTU either at the station or during transit. This may be accomplished by having domain specific knowledge and a way to express and leverage that knowledge. Because the knowledge about hotspots is ontological in nature, it may be readily adapted for new information (such as a breakdown of specific spots) and new services.

Capturing the real time nature of that knowledge may be included in yet another embodiment. In this embodiment, the FDB may assign specific elements for monitoring the performance of one or more hot spots to a subset of federated WRTUs, effectively spreading the sensing and reporting load over a wide range. Whenever the FDB detects (many detection algorithms may be used including but not limited to location based probing, time based probing, or interfacing to a RADIUS server) a federated WRTU in a specific hot spot, the FDB may determine what sensing algorithm(s) (or parameters) to send to said WRTU for implementation. The FDB may also send different parameters to other members of the WRTU federation. One use of this embodiment may be mapping the throughput at a specific hot spot controlled by a WAP. If only one member of the WRTU federation is using the hot spot, throughput measurements may be done and reported at a predetermined frequency, such as every 10 minutes. This may be done because this hot spot is considered to be lightly loaded and thus unlikely to be throughput challenged. If ten members of the WRTU federation are using the same hot spot, however, the throughput may be reduced and require more reporting (not necessarily more probing by each member). The effective measurement rate may be changed to once every minute by distributing probing among WRTUs. If for example, twenty members of the WRTU federation use the same spot, the measurement rate may be changed to once every five minutes to preserve battery life.

In another embodiment, the FDB may manage a policy for sharing information about hot spots and the commerce supported by the hot spots. This may allow WRTUs that are members of a federation to benefit from others in the federation and thus create an incentive to increase and energize said federation. In this embodiment, whenever a member of the federation receives for example a series of VPN configurations or an electronic coupon, other members of the same federation (filtered based on their locations and preferences) may receive the same item. This may insure a group discovery of new hotspots and new commercial offers. In another embodiment, WRTUs may have the ability to forward those items to members of the federation. In another embodiment, WRTUs may have the ability to forward a subset of those items to non-members of the federation.

In yet another embodiment, the OLB may interface with one or more ecommerce web sites, enabling the integration of commercial incentives and economic incentives with wireless access. This integration may enable the owner of a WAP to offset the cost of providing network access for his consumers and providing an instantaneous linkage between access to wireless services and other economic activities. This linkage may be bidirectional wireless access to commercial incentives as well as commercial incentives to wireless access. An example of such integration may be, but is not limited to, for example a coffee shop that permits access to the WAP if something is purchased). Whenever a federated WRTU comes into the coverage area, a configuration message indicating this linkage may be displayed on the WRTU. When the WRTU owner accepts the offer, access to the wireless network (or a subset of wireless network capabilities) may be downloaded along with the automated economic transaction (in this case the purchase of a cup of coffee).

It should be understood that the features described herein are not limited to the particular embodiments disclosed, but is are to cover all modifications which are within the spirit and scope of the described features, as defined by the appended claims, the above description, and/or as shown in the attached drawings.

Although features and elements are described above in particular combinations, one of ordinary skill in the art will appreciate that each feature or element can be used alone or in any combination with the other features and elements. Although the solutions described herein consider 802.11 specific protocols, it is understood that the solutions described herein are not restricted to this scenario and are applicable to other wireless systems as well. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

What is claimed is:

1. A method for creating and managing a federation of wireless receive/transmit units (WRTUs), the method comprising:
   receiving a request from at least one WRTU from a plurality of WRTUs to create a federation of WRTUs;
   requesting a federated community identification (FCI) from a management server;
   receiving the FCI from the management server;
   storing the FCI in a storage device;
   requesting a management policy object (MPO) from the management server;
   receiving the MPO from the management server;
   storing the MPO in the storage device; and
   managing the federation of WRTUs based on the received FCI and received MPO.

2. The method of claim 1, wherein the MPO is encoded in one or more digital objects and transmitted to the at least one WRTU from the plurality of WRTUs to enable a transaction.

3. The method of claim 2, wherein the one or more digital objects are taken from a virtual private network (VPN) profile, economic incentive, or transaction incentive.

4. The method of claim 1, further comprising:
   managing a federation of wireless access points (WAPs) based on the received FCI and received MPO.

5. The method of claim 4, wherein managing a federation of wireless access points (WAPs) based on the received FCI and received MPO includes managing the WRTUs in the federation of WRTUs to share information about hot spots and commerce supported by the hot spots.

6. The method of claim 4, further comprising:
   receiving a request from at least one WAP from a plurality of WAPs to create a federation of WAPs;
   creating a record of the at least one WAP in an Ontology Library (OLB) management server;
   storing descriptions associated with the at least one WAP in the OLB management server;
   identifying operations supported by the at least one WAP based on the descriptions associated with the at least one WAP; and
   storing the identified operations in the OLB management server.

7. The method of claim 6, wherein the descriptions are associated with device specifications of the at least one WAP.

8. The method of claim 6, wherein the descriptions are associated with operational and performance parameters of the at least one WAP.

9. The method of claim 6, further comprising:
   obtaining at least one business model attribute (BMA) from a plurality of BMAs associated with the at least one WAP;
   matching the at least one BMA with concepts in the OLB management server based on geographic location; and
   assigning transaction terms defined in the OLB management server to the at least one WAP based on the matched at least one BMA.

10. The method of claim 9, wherein the at least one BMA is permanent free access, free access for loyal customers, rental access, trade access, credit for access, or relay access.

11. The method of claim 9, wherein transactions are enabled based on the assigned transaction terms.

12. The method of claim 6, wherein said descriptions associated with the at least one WAP are stored as concepts of a device ontology.

13. The method of claim 6, wherein said descriptions associated with the at least one WAP are ontological concepts which are part of an ontology library used to provide collective information for an access point ontology.

14. The method of claim 4 wherein said managing a federation of wireless access points (WAPs) based on the received FCI and received MPO includes being configured to manage the federation of wireless access points (WAPs) based on the received FCI and the received MPO to integrate wireless connectivity management and business applications.

15. The method of claim 1, wherein the federation of wireless receive/transmit units is organized based on a set of locations, activities or commerce.

16. The method of claim 1, wherein said federation of WRTUs are a set of WRTUs whose users adhere to standards of social behavior or standards of commerce.

17. The method of claim 1, wherein whenever one of said plurality of WRTUs in said federation of WRTUs receives a series of Virtual Private Network configurations or an electronic coupon, other WRTUs in said plurality of WRTUs in said federation of WRTUs receive the same series of Virtual Private Network configurations or the same electronic coupon.

18. The method of claim 1, further comprising:
determining whether a WRTU of said federation of WRTUs is using a hot spot controlled by a first Wireless Access Point (WAP); and
in response to determining that a WRTU of said federation of WRTUs is using a hot spot controlled by a first WAP determining what sensing algorithm to send to said WRTU determined to be using said hot spot for implementation.

19. The method of claim 18,
wherein said sensing algorithm is an algorithm for monitoring the performance of said hot spot.

20. The method of claim 19, further including
receiving throughput measurement reports from said WRTU using said hot spot at a predetermined frequency.

\* \* \* \* \*